United States Patent [19]

Tendler

[11] Patent Number: 4,937,796
[45] Date of Patent: Jun. 26, 1990

[54] VEHICLE BACKING AID

[76] Inventor: Robert K. Tendler, 19 Lawrence Ave., Chestnut Hill, Mass. 02167

[21] Appl. No.: 295,436

[22] Filed: Jan. 10, 1989

[51] Int. Cl.$^5$ ............................................. G01S 15/00
[52] U.S. Cl. ..................................... 367/116; 367/909
[58] Field of Search .................. 367/909, 96, 13, 116; 340/903, 904; 381/51

[56] References Cited

U.S. PATENT DOCUMENTS

| | | | |
|---|---|---|---|
| 4,333,028 | 6/1982 | Panton | 310/312 |
| 4,654,834 | 5/1987 | Dorr | 367/909 |
| 4,672,590 | 6/1987 | Tendler | 367/116 |
| 4,674,073 | 6/1987 | Naruse | 367/909 |
| 4,677,595 | 6/1987 | Obayashi et al. | 367/13 |
| 4,737,939 | 4/1988 | Ricketts | 367/158 |
| 4,803,670 | 2/1989 | Chen | 367/909 |
| 4,811,310 | 3/1989 | Wille | 367/173 |

Primary Examiner—Thomas H. Tarcza
Assistant Examiner—Daniel T. Pihulic

[57] ABSTRACT

A method and apparatus is provided for alerting the operator of a vehicle as to the distance from the rear of the vehicle to a structure such as a loading dock to which the vehicle is being backed through the utilization of sonar ranging and means for converting a detected range into an audible call out of the distance from the back of the vehicle to the structure to which the vehicle is being backed. In one embodiment the talking unit is activated upon the placing of the vehicle in reverse gear. When used on trucks, the transducer is removably mountable to the rear of the truck, with a transmission line lead to the cab of the truck. In the preferred embodiment, a 50 kH$_2$ transducer is utilized to project a fan beam of radiation from the back of the vehicle so that not only is the closest projecting object in the path of the beam detected and the distance thereto annunciated, any pedestrians or persons having a height commensurate with that of the mounted transducer will cause the range to that person to be annunciated, thereby providing an alarm indication to the driver. In a further embodiment, the transducer is protected from the elements and is either open to the elements only during backing, or is cleaned such that road grime and other hydrocarbons do not contaminate the transducer surface except at such limited times as when the vehicle is in reverse. The audiblization of the distance between the back of the truck and the structure to which it is backed may be provided at a predetermined rate, or may be predicated on a predetermined range change or, may be called out only at preset distances.

16 Claims, 1 Drawing Sheet

VEHICLE BACKING AID

FIELD OF INVENTION

This invention relates to safety devices and more particularly to a method and apparatus for verbally annunciating to the driver of a vehicle the distance between the back of the vehicle and a structure to which the vehicle is backed, thereby to provide the operator of the vehicle with audible range information.

BACKGROUND OF THE INVENTION

Truckers and motor vehicle operators have in the past maneuvered their vehicles into loading docks utilizing visual cues, mostly through the utilization of side mirrors or in some cases remote-controlled cameras. Mostly the backing of a vehicle is performed safely only with a skilled operator. It will however be appreciated, especially with trailers and other large vans, that there is a large blind spot to the rear of the vehicle, which prevents the operator from visually assessing the distance to either a loading dock or to alert him to the passage of an individual, animal or child behind the vehicle.

In another field, verbalization of depth through the utilization of annunciating depth sounders includes U.S. Pat. Nos. 4,489,405, 4,621,348, 4,616,350, 4,672,590 and U.S. Pat. No. 4,234,941 which, inter alia, describe the verbal annunciation of the depth of water under a marine vessel. The transducers utilized in such situations are not applicable to through-the-air transmission and therefore sonic ranging for land based vehicles is not contemplated with the sonar systems utilized for aquatic navigation.

Moreover, while through-the-air acoustic ranging has been achieved through the utilization of transducers produced by the Polaroid Corporation, they have proved to be unsuitable for use in vehicular applications primarily because the particular through-the-air transducers are deleteriously affected by hydrocarbons, road grime and dirt. Moreover, the beam width of such transducers is excessively narrow which makes it difficult if not impossible to provide for the type of coverage which would prevent the backing of a vehicle into a pedestrian, animal or unseen structural impediment. The problem with the Polaroid-based technology is so severe that even when contemplating utilizing such sonar systems for automotive speed control or braking control so as to prevent vehicular accidents, such systems have universally been rejected due to the problem of providing a suitable transducer.

By way of further background, sonar ranging through the air has been utilized in industrial process environments in which the position of articles on a conveyer belt is monitored through a short-distance sonar ranging system. It will be appreciated however that these systems can be controlled as to the environment and therefore the transducers utilized can be operated in a clean environment in order to assure production line operation. Typically, these systems do not operate for ranges in excess of tens of feet, and therefore are not suitable for vehicular use. Moreover, safety factors are not as severe in the industrial environment, and safeguards for maintaining production are relatively easy to achieve in such a controlled environment.

SUMMARY OF THE INVENTION

In contradistinction to the prior utilization of sonar ranging through the water, the Subject System provides a method and apparatus for alerting the operator of a motor vehicle to assist in the backing operation. In the Subject System a 50 kHz transducer, with a beam width of 40° provides the required transmitted pulses and detection of the returned pulses to enable the safe and efficient collection of range data through conventional sonar ranging techniques. The system, in general, may be turned on by the operator, with the unit in the cab of the vehicle. Alternatively, the unit may be automatically turned on whenever the vehicle is placed in reverse. Thus, unlike the systems which merely warn pedestrians that a vehicle is in reverse by sending out an alarm signal such as a beeping sound, the driver within the vehicle is alerted to the actual distance between the back of his vehicle and the nearest obstacle, be it a pedestrian, an unauthorized structure such as a post, or the desired structure which may be the closest point of the loading dock. A count down of the number of feet to the loading dock is an extremely useful aid in the backing of the vehicle due to the aforementioned blind spots which prevent accurate visual determination, through parallax, of the distance between the back of the truck and the loading dock.

In one embodiment a capacitive transducer, unaffected by hydrocarbons and dirt is utilized in the 50 kHz range to provide a range of at least 100 feet with a beam angle of approximately 40 degrees. This encompasses enough of an area to provide a margin of safety in the backing of the vehicle. The transducer may be provided with a collumnating device such as a tube so that the beam can be considerably narrowed, if such is desired.

Alternatively, transducers which would normally be affected by hydrocarbons and contamination from the ambient, can be provided in a sealed housing with a shutter operated to open an aperture for the transducer only when the unit is turned on by the vehicle either being placed in reverse or by a manual turn on by the operator of the vehicle. Additionally, should the housing not provide enough security against contamination, a transducer cleaning liquid may be sprayed across the transducer face to periodically clean the transducer every time the system is actuated or, in response to a transducer efficiency monitor. In the latter case, if the transducer drops below a certain efficiency, the transducer is cleaned and an alarm indication is provided to the operator of the vehicle to indicate that the talking unit is in need of maintenance.

In summary, a method and apparatus is provided for alerting the operator of a vehicle as to the distance from the rear of the vehicle to a structure such as a loading dock to which the vehicle is being backed through the utilization of sonar ranging and means for converting a detected range into an audible call out of the distance from the back of the vehicle to the structure to which the vehicle is being backed. In one embodiment the talking unit is activated upon the placing of the vehicle in reverse gear. When used on trailer trucks the transducer is removably mountable to the rear of the truck, with a transmission line lead to the cab of the truck. The removable mounting system may include a permanent magnet, a suction cup, tongue and groove couplings or any type of suitable clamp. In the preferred embodiment, a 50 kHz transducer is utilized to project a fan beam of radiation from the back of the vehicle so that not only is the closest projecting object in the path of the beam detected and the distance thereto annunciated, any pedestrians or persons having a height commensurate with that of the mounted transducer will cause the range to that person to be annunciated, thereby providing an alarm indication to the driver. In a further embodiment, the transducer is protected from the elements and is either open to the elements only during backing or is cleaned such that road grime and other hydrocarbons do not contaminate the transducer surface except at such limited times as when the vehicle is in reverse. The audiblization of the distance between the back of the truck and the structure to which it is backed may be provided at a predetermined rate, or may be predicated on a predetermined range change or, may be called out only at preset distances.

BRIEF DESCRIPTION OF THE DRAWINGS

These and other features of the Subject Invention will be better understood in conjunction with a Detailed Description taken in conjunction with the Drawings of which.

DETAILED DESCRIPTION

Figure 1:
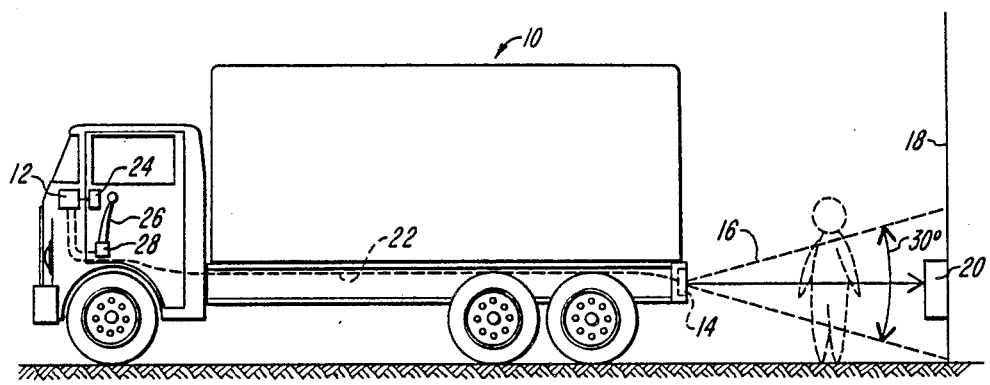
FIG. 1 is a diagrammatic illustration of the backing of a vehicle to a loading dock utilizing the Subject System; and, FIG. 2 is a block diagram of a system for providing an audible indication, in a human voice, of the distance between a backing vehicle and a structure in the path of the sonar beam.

Referring now to FIG. 1 a vehicle generally indicated by reference character 10 which may be a truck, a tractor trailer or even a passenger vehicle is provided with a talking unit 12 which includes apparatus for transmitting sonar pulses to a transducer 14, in one embodiment removably attachable to the rear of vehicle 10 which produces a beam of sonar pulses 16 directed towards a structure 18 which may be a loading dock having a loading platform 20 which projects outwardly from the building structure. The beam width of the transducer in one embodiment may be anywhere from 2° to 40° depending on the type of focusing utilized for transducer 14. Should a pedestrian be interposed between the edge of platform and transducer 14, the unit will announce the distance to the pedestrian as opposed to that of the loading dock. The transducer in one embodiment is transducer model MC102-0012 operating at 50 kHz manufactured by Ocean Motions Company, of Barrington, Rhode Island. Note a transmission line 22 is led from the transducer to unit 12, where the return pulses are analyzed and the range determined, with the range being annunciated by a built-in or auxiliary speaker 24 mounted at or near unit 12. Thus when backing the truck the unit may be responding by the annunciation "... 7, 6, 5, 4, 3, 2, 1" in a human sounding voice as produced by a speech synthesizer. This can be accomplished either with an annunciation at a set time interval such as every two or four seconds, or on the basis of a predetermined change in range, such as 1 foot, so that every time the range changes by 1 foot an annunciation is generated. Additionally, the annunciation may take place at predetermined ranges such as, for instance, 20 feet, 15 feet, 10 feet, 5 feet, 4 feet, 3 feet, 2 feet, and 1 foot. This enables the operator of the vehicle to be provided with more frequent updates at preset ranges as the vehicle comes into closer proximity with respect to that structure to which the vehicle is being backed.

As mentioned above, the unit 12 may be actuated either by a manual turn on switch or through the operation of a shift lever 26 which has a switch 28 that is actuated when the shift lever is placed in reverse. This is common for vehicles in which a back up alarm is provided.

As will be described on connection with FIG. 2, it is possible to provide an alarm function for the back talking unit such that the presence of pedestrians can be indicated. This indication can be based on a rapid deviation in the range change rate assuming backing at a steady rate. Should a pedestrian walk across the back of the truck the range would presumably vary instantaneously. Should such a $\Delta R/\Delta T$ or change in range per unit time exceed a certain threshold, this can be detected and an alarm signal actuated either by virtue of providing a separate alarm indication such as a bell, buzzer or light; or by providing that the speech synthesizer utilized in unit 12 produce a warning annunciation, such as "Danger". It will also be appreciated that such a warning could in fact be ascertained by the operator of the vehicle, because an unexpected range would be announced.

Figure 2:
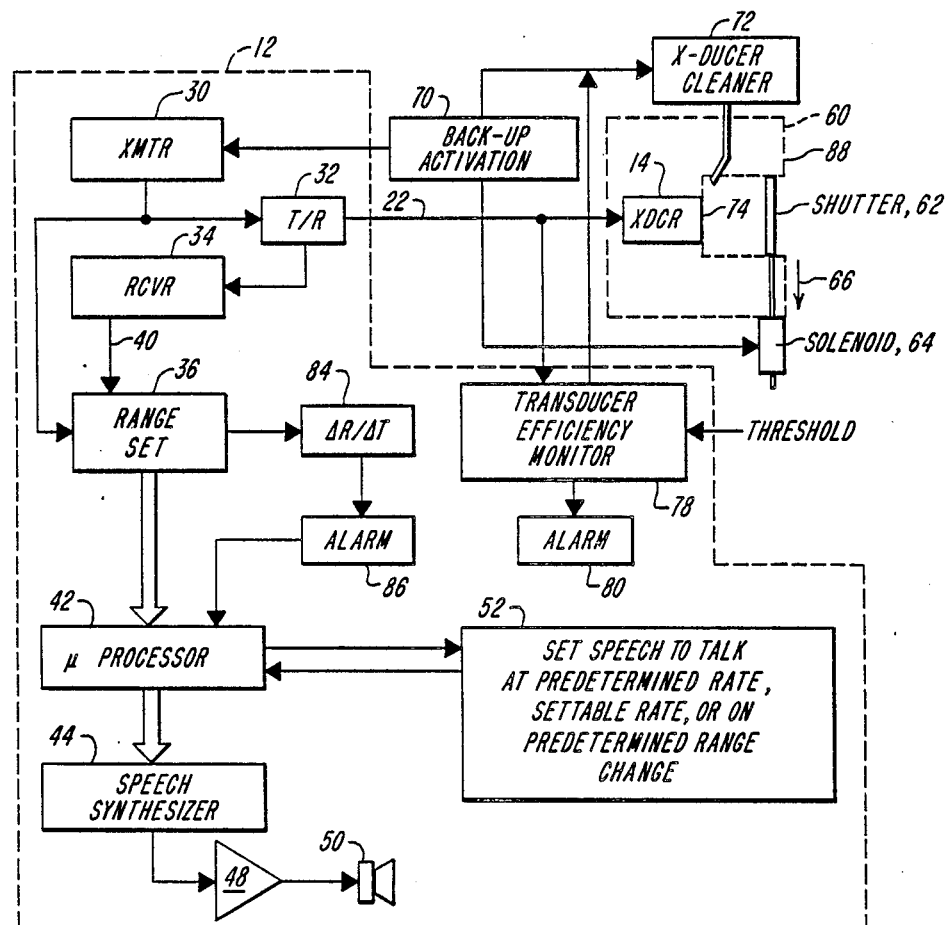

Referring now to FIG. 2, back talker unit 12 includes a transmitter 30 which in one embodiment produces pulses at 50 kHz provided to a T/R switch 32 which couples the pulses over transmission line 22 to transducer 14. The received pulses are transmitted back along transmission line 22 through T/R switch 32 to a suitable receiver 34 which produces an output pulse corresponding to the detected outgoing and incoming pulses. The transmitted pulse is provided to a range detecting unit 36 which may include a counter which is reset by a portion of the transmit pulse delivered over line 38, with the counter being stopped by the provision of a detected pulse from receiver 34 over line 40. It will be appreciated that the clocking of the counter within range detector 36 provides an indication of range in terms of the number available at the output of this counter. The range detector converts the count in the counter to a number representative of the range, which number is coupled to a microprocessor 42 which provides the appropriate signals for activating and driving speech synthesizer 44 to produce an audible human voice reproduction of the number representing the range. This output is amplified at 48 and is provided to a speaker 50 or other device such as an earphone capable of producing an audible human language rendition of the range.

Microprocessor 42 may be controlled by a unit 52 which determines the mode in which the back talking unit will annunciate the range. In one embodiment the microprocessor may output the voice code to the speech synthesizer at a predetermined rate, for instance, every 4 seconds. The rate may even be settable; or the microprocessor may activate the speech synthesizer when a change in range, $\Delta R$, of, for instance, 1 foot, 2 feet or 3 feet has occurred. This means that the speech synthesizer would be activated on a predetermined range change. The synthesizer could also be activated when a predetermined range has been reached. In any event it is possible to control the mode in which the back talking unit annunciates the range in any number of ways deemed desirable by the operator of the vehicle.

It will be seen that if transducer 14 is of the type that is sensitive to environmental contamination it may be housed in an enclosure or housing 60 which has a shutter 62 activated by a solonoid 64 which may be moved in a direction illustrated by arrow 66 so as to open up an aperture 68, thereby permitting the operation of the transducer housed therein. The solonoid 64 may be actuated any time that the talking unit is activated such as by a back up activation switch or system here illustrated at 70. If desired, upon opening of aperture 68, a transducer cleaning unit 72 may be actuated to clean the face 74 of transducer 14 so that peak efficiency can be established regardless of the environmental conditions. The transducer cleaner may be a liquid cleaner or even a blast of clean air across the face of the transducer; or may be in the nature of a vacuum cleaning device. Moreover, any type of cleaning such as a windshield wiper type of squeegee may be employed for the transducer cleaning system. The transducer cleaner may be actuated by a transducer efficiency monitor 80 which, in one embodiment samples the pulses along transmission line 22 and should pulse amplitudes drop below a predetermined threshold, not only activates an alarm 80 but also may be utilized to activate transducer cleaning unit 72 in an effort to alleviate any transducer efficiency problems.

As mentioned above a $\Delta R/\Delta T$ detector 84 may be coupled to the output of the range detector, which $\Delta R/\Delta T$ detector is utilized to store ranges which are being acquired by the system, and should the range change rate vary by more than a predetermined amount such as caused by the sudden appearance of a pedestrian in the source beam, an alarm 86 is actuated which would indicate, for instance, the passage of a pedestrian or animal between the back of the vehicle and the structure to which the vehicle is being backed. In this manner the instantaneous interruption of the beam so as to cause a range change indicative of the pedestrian or animal between the back of the truck and the loading dock can be sensed and an alarm actuated; with the alarm either being of a conventional bell, whistle or horn variety; or even a synthesized speech warning which can be played back through the microprocessor 42 programmed for such an occurrence and audiblized through speech synthesizer 44.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. A system for effectively assisting in the backing of a vehicle comprising:
    sonar ranging means having a transducer mounted to the rear of said vehicle, said sonar ranging means including means for generating and projecting a beam of pulsed acoustic energy horizontally through the air behind said vehicle, and for receiving returned pulses and generating therefrom a number corresponding to the distance from said transducer to an object reflecting said beam
    means for converting said number into an audible human speech equivalent, whereby the operator of said vehicle is assisted in the backing thereof through the range callout; and,
    means for detecting a rapid change of detected range in terms of $\Delta R/\Delta T$ for predetermined $\Delta R/\Delta T$ and means for providing an alarm indication responsive thereto.

2. The system of claim 1 wherein said range is called out for predetermined distances.

3. The system of claim 1 wherein said range is called out upon the occurrence of a predetermined range change.

4. The system of claim 1 wherein said range is periodically called out.

5. The system of claim 1 and further including means for ascertaining when said vehicle is backing and for activating said system responsive thereto.

6. The system of claim 1 and further including means for protecting said transducer against contamination.

7. The system of claim 6 wherein said protecting means includes an apertured housing, shuttering means at said aperture, and means for opening said shuttering means responsive to the output of said means for ascertaining when said vehicle is backing.

8. The system of claim 1 and further including means for removing contamination from the face of said transducer.

9. The system of claim 8 and further including means for ascertaining the efficiency of said transducer and for activating said contamination removing means responsive to a drop in efficiency of said transducer.

10. The system of claim 8 wherein said contamination removing means includes means for flushing the face of said transducer with a fluid.

11. The system of claim 8 wherein said contamination removing means includes means for wiping the face of said transducer.

12. A system for effectively assisting in the backing of a vehicle comprising:
    sonar ranging means having a transducer mounted to the rear of said vehicle, said sonar ranging means including means for generating and projecting a beam of pulsed acoustic energy horizontally through the air behind said vehicle, and for receiving returned pulses and generating therefrom a number corresponding to the distance from said transducer to an object reflecting said beam;
    means for converting said number into an audible human speech equivalent, whereby the operator of said vehicle is assisted in the backing thereof through the range callout;
    means for removing contamination from the face of said transducer; and,
    means for ascertaining the efficiency of said transducer and for activating said contamination removing means responsive to a drop in efficiency of said transducer.

13. The system of claim 1 wherein said alarm indication is a human voice annunciation of a predetermined phrase or utterance.

14. The system of claim 1 and further including means for removably mounting said transducer to the back of said vehicle, whereby said sonar ranging means can be mounted in the cab of a trailer truck, with the transducer being removable from the back of the trailer.

15. The system of claim 14 wherein said removable mounting means includes a magnet.

16. The system of claim 14 wherein said removable mounting means including suction means.

* * * * *